United States Patent
Lee et al.

(10) Patent No.: US 12,530,924 B2
(45) Date of Patent: Jan. 20, 2026

(54) APPARATUS AND METHOD WITH LIVENESS CONSIDERATION

(71) Applicant: SAMSUNG ELECTRONICS CO., LTD., Suwon-si (KR)

(72) Inventors: Solae Lee, Suwon-si (KR); Youngjun Kwak, Seoul (KR); Byung In Yoo, Seoul (KR); Hana Lee, Suwon-si (KR); Jiho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 786 days.

(21) Appl. No.: 17/863,601

(22) Filed: Jul. 13, 2022

(65) Prior Publication Data

US 2023/0215219 A1   Jul. 6, 2023

(30) Foreign Application Priority Data

Jan. 5, 2022   (KR) .................. 10-2022-0001677

(51) Int. Cl.
*G06V 40/40*   (2022.01)
*G06V 40/16*   (2022.01)

(52) U.S. Cl.
CPC ............ *G06V 40/40* (2022.01); *G06V 40/161* (2022.01)

(58) Field of Classification Search
None
See application file for complete search history.

(56) References Cited

U.S. PATENT DOCUMENTS

| 11,030,437 B2 | 6/2021 | Fan et al. |
| 2022/0051412 A1* | 2/2022 | Gronau ................ G06V 40/172 |

FOREIGN PATENT DOCUMENTS

| CN | 113052976 A | 6/2021 |
| EP | 3 382 602 A1 | 10/2018 |
| EP | 3382598 A2 * | 10/2018 |
| EP | 3 836 011 A1 | 6/2021 |
| JP | 2021-149665 A | 9/2021 |
| KR | 10-2007-0117393 A | 12/2007 |
| KR | 10-2019-0098656 A | 8/2019 |
| KR | 10-2020-0127818 A | 11/2020 |
| KR | 10-2021-0108082 A | 9/2021 |
| KR | 10-2021-0129503 A | 10/2021 |
| KR | 10-2307671 B1 | 10/2021 |

OTHER PUBLICATIONS

Extended European search report issued on Apr. 3, 2023, in counterpart European Patent Application No. 22198806.6 (8 pages in English).

Korean Office Action issued on Jun. 27, 2024, in counterpart Korean Patent Application No. 10-2022-0001677 (4 pages in English, 7 pages in Korean).

* cited by examiner

*Primary Examiner* — Edward Park
(74) *Attorney, Agent, or Firm* — NSIP Law (57) ABSTRACT

A liveness test method includes detecting a face region in an input image; generating, based on the detected face region, weight map data related to a face location in the input image; generating concatenated data by concatenating the weight map data with feature data generated from an intermediate layer of a liveness test model or image data of the input image; and generating a liveness test result based on a liveness score generated by the liveness test model provided with the concatenated data.

20 Claims, 9 Drawing Sheets

APPARATUS AND METHOD WITH LIVENESS CONSIDERATION

CROSS-REFERENCE TO RELATED APPLICATIONS

This application claims the benefit under 35 USC § 119(a) of Korean Patent Application No. 10-2022-0001677, filed on Jan. 5, 2022, at the Korean Intellectual Property Office, the entire disclosure of which is incorporated herein by reference for all purposes.

BACKGROUND

1. Field

The following description relates to an apparatus and method with liveness consideration.

2. Description of Related Art

In a user authentication system, a computing device may determine whether to allow a user to access the computing device based on authentication information provided by the user. For example, the authentication information may include a password input by the user or biometric information of the user. The biometric information includes information related to a fingerprint, an iris, or a face.

Face anti-spoofing technology may be used to improve the security of a user authentication system. Face anti-spoofing determines whether a face of a user input to a computing device is fake or genuine. For this purpose, features such as local binary patterns (LBP), histogram of oriented gradients (HOG), and difference of Gaussians (DoG) may be extracted from an input image, and whether an input face is fake may be determined based on the extracted features. Face spoofing is a form of attack using photographs, moving images or masks, and it is important to identify such attacks in a face verification process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes detecting a face region in an input image; generating, based on the detected face region, weight map data related to a face location in the input image; generating concatenated data by concatenating the weight map data with feature data generated from an intermediate layer of a liveness test model or image data of the input image; and generating a liveness test result based on a liveness score generated by the liveness test model provided with the concatenated data.

The weight map data may include a first region corresponding to the face region in the input image and a second region corresponding to a non-face region in the input image. A weight of the first region and a weight of the second region may be different from each other.

A weight of the weight map data may vary based on a distance from a center of a corresponding region of the weight map data corresponding to the face region.

The weight map data may include a reduced region of the corresponding region, the corresponding region, and an extended region of the corresponding region. The reduced region, the corresponding region, and the extended region may overlap to be disposed based on the center of the corresponding region.

A first weight of the reduced region may be greater than a second weight of a region between the corresponding region and the reduced region, and the second weight may be greater than a third weight of a region between the extended region and the corresponding region.

The liveness test model may include providing the concatenated data to another intermediate layer of the liveness test model, in response to the concatenated data being generated by concatenating the weight map data and the feature data generated from the intermediate layer. The other intermediate layer may be subsequent to the intermediate layer.

The liveness test model may include providing the concatenated data to an input layer of the liveness test model, in response to the concatenated data being generated by concatenating the weight map data and the image data of the input image.

The generating of the weight map data may include generating the weight map data using a neural network-based weight map generation model.

A weight of a first region of the weight map data corresponding to the face region may be different from a weight of a second region of the weight map data corresponding to an occlusion region in the face region.

The generating of the concatenated data may include adjusting a size of the weight map data to correspond to a size of the feature data, and generating the concatenated data by concatenating the feature data and the weight map data of which the size is adjusted.

In a general aspect, embodiments include a non-transitory computer-readable storage medium storing instructions that, when executed by a processor, cause the processor to perform the any one or any two or more of any combination, or all operations described herein.

In another general aspect, an apparatus includes a processor configured to detect a face region in an input image; generate, based on the detected face region, weight map data related to a face location in the input image; generate concatenated data by concatenating the weight map data with feature data generated from an intermediate layer of a liveness test model or image data of the input image; provide the concatenated data to the liveness test model; and determine a liveness test result based on a liveness score determined by the liveness test model.

The weight map data may include a first region corresponding to the face region in the input image and a second region corresponding to a non-face region in the input image. A weight of the first region and a weight of the second region may be different from each other.

A weight of the weight map data may vary based on a distance from a center of a corresponding region of the weight map data corresponding to the face region.

The processor may be further configured to provide the concatenated data to another intermediate layer of the liveness test model, in response to the concatenated data being generated by concatenating the weight map data and the feature data generated from the intermediate layer, and the other intermediate layer may be subsequent to the intermediate layer.

The processor may be further configured to provide the concatenated data to an input layer of the liveness test model, in response to the concatenated data being generated by concatenating the weight map data and the image data of the input image.

The processor may be further configured to generate the weight map data using a neural network-based weight map generation model. A weight of a first region of the weight map data corresponding to the face region may be different from a weight of a second region of the weight map data corresponding to an occlusion region in the face region.

The apparatus may further include a memory storing instructions. The processor may be further configured to execute the instructions, which configures the processor to perform the detection of the face region, generation of, based on the detected face region, the weight map data, generation of the concatenated data, and determination of the liveness test result In another general aspect, an electronic device includes a camera configured to obtain an input image and a processor. The processor is configured to detect a face region in the input image; generate, based on the detected face region, weight map data related to a face location in the input image; generate concatenated data by concatenating the weight map data with feature data generated from an intermediate layer of a liveness test model to which the input image is input or image data of the input image; provide the concatenated data to the liveness test model; and determine a liveness test result based on a liveness score determined by a liveness test model.

The weight map data may include a first region corresponding to the face region in the input image and a second region corresponding to a non-face region in the input image, and a weight of the first region and a weight of the second region may be different from each other.

The processor may be further configured to provide the concatenated data to another intermediate layer of the liveness test model, in response to the concatenated data being generated by concatenating the weight map data and the feature data generated from the intermediate layer, and the other intermediate layer may be subsequent to the intermediate layer.

In another general aspect, an apparatus includes a processor configured to detect a face region in an input image; generate, based on the detected face region, weight map data related to a face location in the input image, the weight map data including a plurality of regions each having different weights; generate concatenated data by concatenating one of the regions of the weight map data with feature data generated from a layer of a liveness test model; provide the concatenated data to the liveness test model; and determine a liveness test result based on a liveness score determined by the liveness test model.

A first region of the plurality of regions may correspond to the face region and a second region of the plurality of regions may correspond to a non-face region in the input image.

A first region of the plurality of regions may correspond to a reduced region of the face region, a second region of the plurality of regions may correspond to the face region, and a third region of the plurality of regions may correspond to an extended region of the face region.

The liveness test model may be a machine learning model or neural network model.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains and after an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

Figure 1:
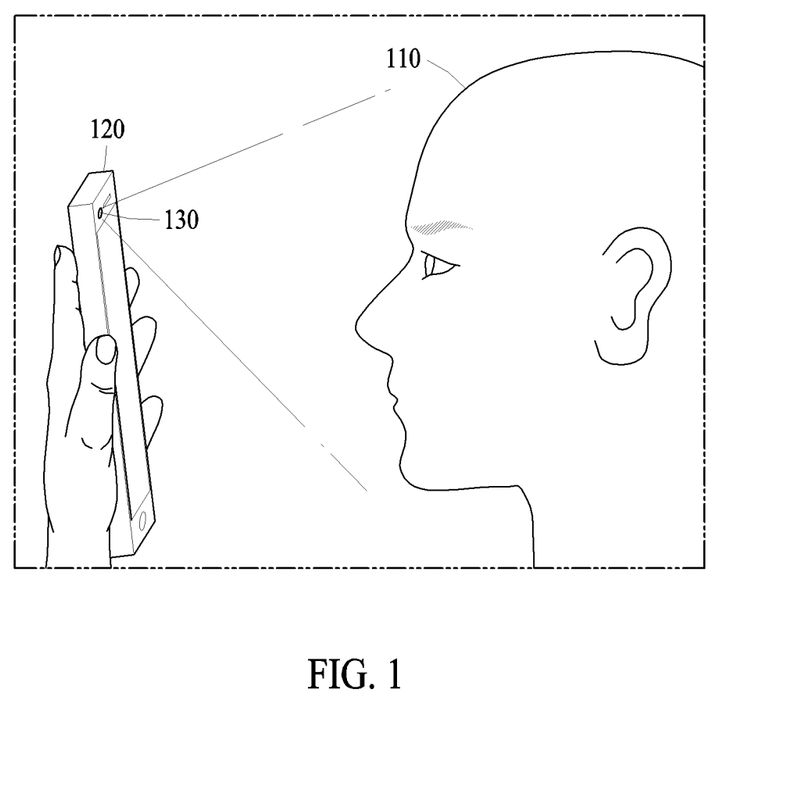
FIGS. 1 and 2 illustrate examples of biometric authentication and a liveness test, according to one or more embodiments.
Figure 2:
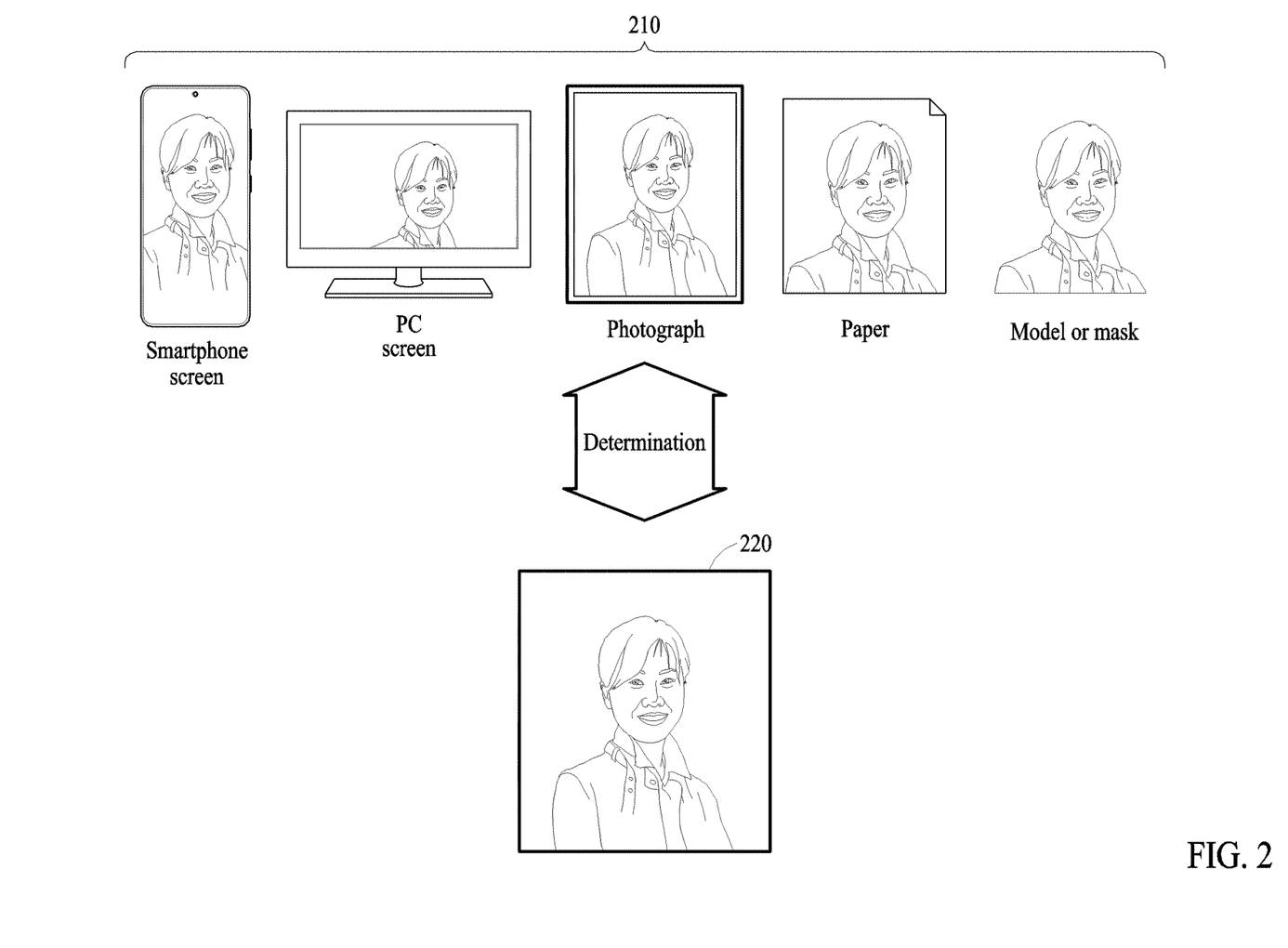

FIGS. 1 and 2 illustrate examples of biometric authentication and a liveness test, according to one or more embodiments.

Biometric authentication is an authentication technology that uses personal biometric information such as fingerprint, iris, face, vein, and skin, among authentication technologies, for user verification. In biometric authentication, face verification is an authentication technology that determines whether a user attempting an authentication is a valid user based on the face information of the user. For example, face verification may authenticate a valid user for user login, payment service, and access control.

Referring to FIG. 1, an electronic device 120 (e.g., an electronic device 800 of FIG. 8) may authenticate an object 110 (e.g., a user) attempting to access the electronic device 120 through biometric authentication. The electronic device 120 may obtain image data related to the object 110 using a camera 130 included in the electronic device 120 and determine an authentication result by analyzing the obtained image data. A biometric authentication process may include extracting a feature from the image data, comparing the extracted feature with an enrolled feature for a valid object, and determining whether authentication is successful based on the comparison result. For example, assuming the electronic device 120 is locked, when it is determined that the authentication of the object 110 is successful, the electronic device 120 may be unlocked, and conversely, when it is determined that the authentication of the object 110 is not successful, the electronic device 120 may remain in a locked mode or block access to the object 110. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

A valid user of the electronic device 120 may enroll biometric features of the user in advance to the electronic device 120 through an enrollment process. The electronic device 120 may store information to be used to identify the valid user in a storage device or cloud storage. For example, a face image or a facial feature of the valid user extracted from the face image may be stored as the enrolled biometric feature of the valid user.

A liveness test may be performed in the biometric authentication process described above. The liveness test may examine whether the object 110 is animate and determine whether a biometric authentication means is genuine. For example, the liveness test may examine whether a face appearing in an image captured by the camera 130 is a genuine or fake face of a person. The liveness test may distinguish between an inanimate object (e.g., a photograph, paper, a moving image, a model, a mask, etc.) and an animate object (e.g., a person's real face). Herein, the term "liveness test" may be replaced with "liveness detection." Depending on the example, the electronic device 120 may perform either one or both of the liveness test and the biometric authentication.

FIG. 2 illustrates examples of a fake face 210 and a genuine face 220, according to one or more embodiments. The electronic device 120 may identify whether a face shown in an image is the genuine face 220 through a liveness test. In an example, the electronic device 120 may distinguish between a fake face 210 shown in any one of a screen, a photograph, paper, a model, and the like and the genuine face 220 through the liveness test.

Referring to FIG. 1, an invalid user may attempt to induce false acceptance of a biometric authentication system using a spoofing technique. For example, in the face verification process, the invalid user may present a substitute, such as a photograph, a moving image, or a model in which a face of a valid user is shown, to the camera 130 to induce a false acceptance. The liveness test may filter out an authentication attempt (or a spoofing attack) made with these substitutes to prevent false acceptance. As a result of the liveness test, when an object to be authenticated is determined to be an inanimate object, a final determination may be made that the authentication is not successful, without performing an authentication determination of whether the object is valid. But even in an example where the authentication process is performed, a final determination may be made that the authentication is not successful, regardless of the authentication result.

The electronic device 120 may perform the liveness test using face location information in a liveness test process. The electronic device 120 may detect a face region in the image data, and use location information of the detected face region to generate weight map data (or face location map data) related to a location of the face region. The electronic device 120 may use the weight map data to determine liveness by concatenating the weight map data with the image data or feature data output from a layer of a liveness test model (e.g., a liveness test model 620 of FIG. 6A). The electronic device 120 may determine a liveness test result considering features of the face and features around the face including contextual information by performing a liveness test using the image data and the weight map data. The liveness test may be more accurate when the weight map data is used than when the weight map data is not used.

Figure 3:
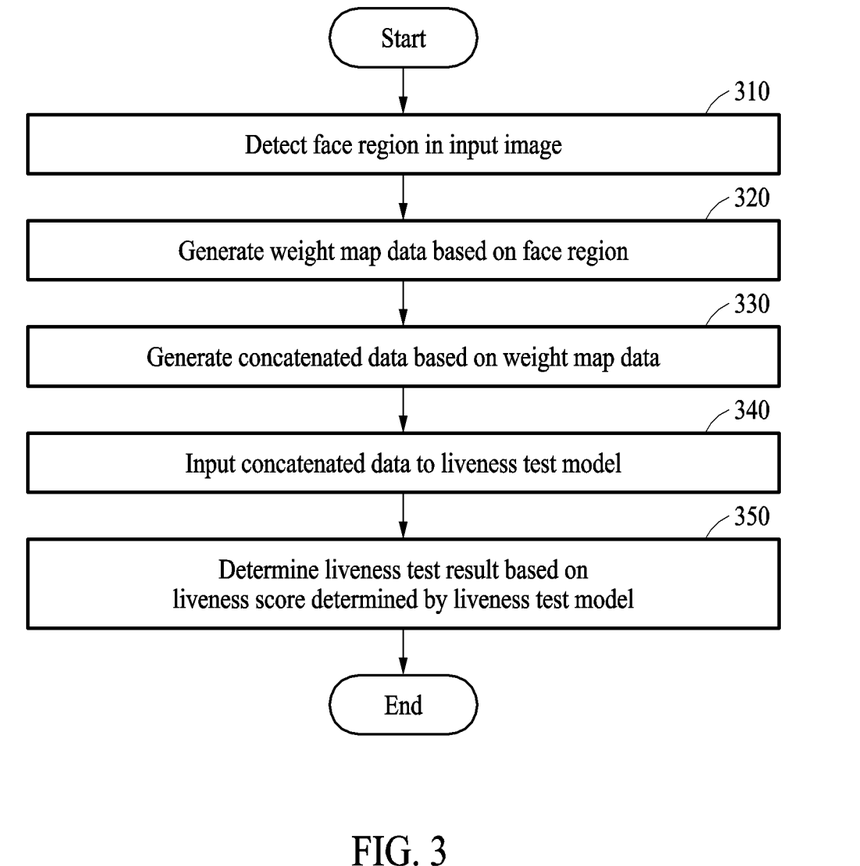
FIG. 3 is a flowchart illustrating an example of a liveness test method, according to one or more embodiments.

FIG. 3 is a flowchart illustrating an example of a liveness test method, according to one or more embodiments. The liveness test method may be performed by a liveness test apparatus (e.g., a liveness test apparatus 700 of FIG. 7).

Referring to FIG. 3, in operation 310, the liveness test apparatus may detect a face region in an input image (or a face image). The face region may include the main parts of a face (e.g., an eye, a nose, a mouth, and an eyebrow) shown in the input image, or only a partial region of the face and not necessarily the entire region of the face. The liveness test apparatus may receive the input image to determine liveness and use at least one of various face region detection techniques to detect the face region in the input image. For example, the liveness test apparatus may use a Haar-based cascade AdaBoost classifier, a neural network trained to detect a face region, or a Viola-Jones detector to detect the face region in the input data. However, the scope of examples is not limited thereto, and the liveness test apparatus may detect the face region using various other face region detection techniques. For example, the liveness test apparatus may detect facial landmarks in the input image and detect a bounding region, including the detected landmarks as a face region.

In an example, the liveness test apparatus may detect reference coordinates for defining a reference location of the face region in the input image, a height from the reference location, and a width from the reference location to define the face region. The face region may be detected, for example, as being a square-shaped region, and in this example, the reference coordinates may be two-dimensional coordinates of a location of an upper left vertex of the detected square-shaped region. However, the scope of examples is not limited thereto, and the face region may be detected, for example, as a circle, an ellipse, or a polygon, and the reference coordinates may be defined as a central location or another vertex location of the face region, for example.

In operation 320, the liveness test apparatus may generate weight map data related to a face location in the input image based on the detected face region. The weight map data may represent a weight distribution that depends on the location of the face region in the input image. According to an example, the weight map data generated by the liveness test apparatus may be defined in various forms. For example, the weight map data may include a first region corresponding to the face region in the input image and a second region corresponding to a non-face region in the input image, and a weight allocated to the first region and a weight allocated to the second region may be different from each other. For example, the weight allocated to the first region may be greater than the weight allocated to the second region.

In an example, the weight map data may have a weight that varies according to a distance from a center of a corresponding region of the weight map data corresponding to the face region of the input image. The weight map data may include a reduced region of the corresponding region, the total corresponding region, and an extended region of the corresponding region. The reduced region, the corresponding region, and the extended region may overlap to be disposed based on the center of the corresponding region. Here, a first weight allocated to the reduced region may be greater than a second weight allocated to a region between the corresponding region and the reduced region, and the second weight may be greater than a third weight allocated to a region between the extended region and the corresponding region.

In an example, the liveness test apparatus may generate the weight map data using a neural network-based weight map generation model. The input image may be input to the weight map generation model, and the weight map generation model may output the weight map data related to the location of the face region in the input image. The weight map generation model may be a model trained based on training data (e.g., a training image) and desired weight map data corresponding to the training data. In a training process, the weight map generation model may update parameters (e.g., connection weights) thereof so as to output weight map data most similar to the desired weight map data corresponding to the input training data. When the weight map generation model is used, a weight for an occlusion region generated by obstacles or accessories (e.g., a hat, a mask, sunglasses, and glasses) that may exist in the face region may be determined more accurately. In the weight map data generated by the weight map generation model the weight allocated to the first region of the weight map data corresponding to the face region may be different from the weight allocated to the second region of the weight map data corresponding to the occlusion region in the face region. The weight allocated to the first region may be greater than the weight allocated to the second region.

In operation 330, the liveness test apparatus may generate concatenated data by concatenating the weight map data with feature data output from a first intermediate layer of a liveness test model and image data of the input image. The liveness test model (e.g., the liveness test model 620 of FIG. 6A and a liveness test model 650 of FIG. 6B) may be a model that outputs a liveness score based on the input image and may be based on a neural network (e.g., a convolutional neural network (CNN)). When concatenating the weight map data and the feature data output from the first intermediate layer, the liveness test apparatus may adjust the size (or a resolution) of the weight map data to correspond to the size (or a resolution) of the feature data and generate the concatenated data by concatenating the feature data and the weight map data of which the size is adjusted.

In operation 340, the liveness test apparatus may input the concatenated data to the liveness test model. When the concatenated data is generated by concatenating the weight map data and the feature data output from the first intermediate layer of the liveness test model, the liveness test apparatus may input the concatenated data to a second intermediate layer of the liveness test model. The second intermediate layer may be an upper layer to the first intermediate layer. When the concatenated data is generated by concatenating the weight map data and the image data of the input image, the liveness test apparatus may input the concatenated data to an input layer of the liveness test model.

In operation 350, the liveness test apparatus may determine a liveness test result based on the liveness score determined by the liveness test model. The liveness test model may be a neural network trained to output the liveness score (or a determination of whether an object is live) based on the input data (e.g., the image data of the input image or the concatenated data of the input image and the weight map data). The liveness test model may output a value calculated by intrinsic parameters as the liveness score in response to the input data. The liveness test model may be, for example, a deep neural network (DNN), a CNN, a recurrent neural network (RNN), a restricted Boltzmann machine (RBM), a deep belief network (DBN), a bidirectional recurrent DNN (BRDNN), a deep Q-network, or a combination of two or more thereof, but is not limited to the foregoing examples. The liveness test model may be implemented by hardware, including a neural processor, or a combination of hardware and instructions implemented the hardware, e.g., as a processor configured to execute the instructions, which configures the processor to implement the liveness test model.

The liveness score output from the liveness test model may be a reference value for determining whether a test subject is live and represent values, such as a numerical value, a probability value, or a feature value indicating that an object, that is the test subject, corresponds to a genuine object or a fake object based on the input data. In an example, the liveness score may represent a value indicating whether a face object corresponds to a genuine face or a fake face. The liveness test apparatus may determine whether the object is live based on whether the liveness score satisfies a preset condition. For example, the liveness test apparatus may determine the object to be a genuine animate object when the liveness score is greater than a threshold value and an inanimate fake object when the liveness score is less than or equal to the threshold value. In an example, when the liveness score is a value indicating whether the object corresponds to a genuine object or a fake object, the liveness test apparatus may determine whether the object is live based on the liveness score.

Figure 4:
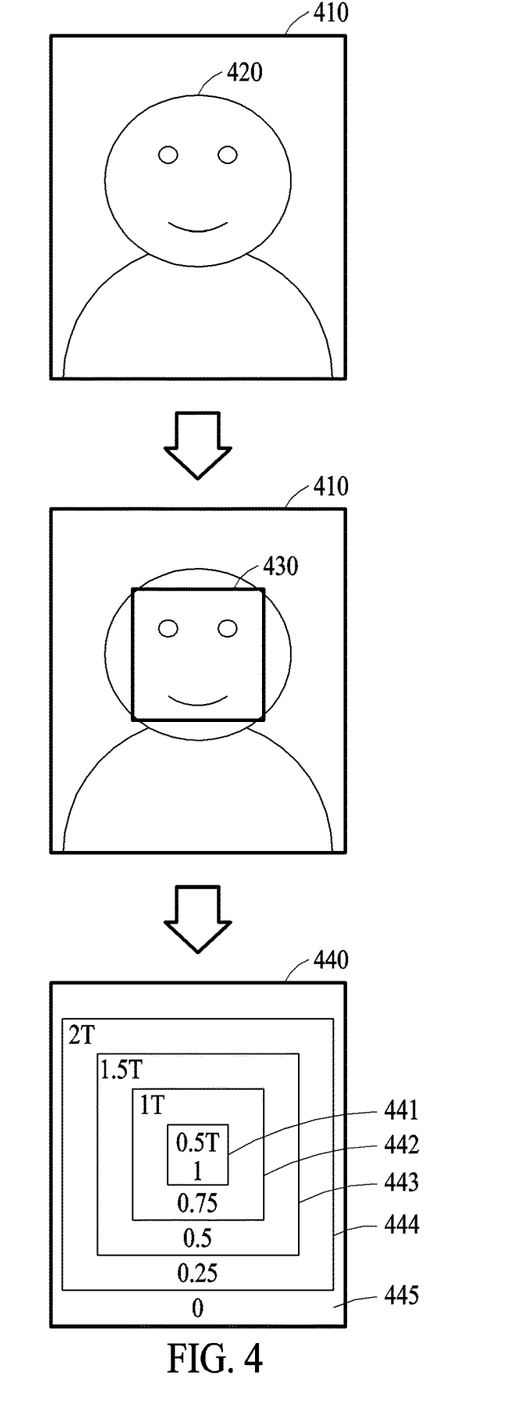
FIG. 4 illustrates an example of generating weight map data, according to one or more embodiments.

FIG. 4 illustrates an example of generating weight map data, according to one or more embodiments.

Referring to FIG. 4, when an input image 410 in which an object 420 is shown is given a liveness test, a liveness test apparatus may detect a face region 430 of the object 420 in the input image 410. A location and size of the face region 430 may be defined, for example, by coordinates of an upper left vertex of a square that defines the face region 430 and the width and height of the square.

The liveness test apparatus may generate weight map data 440 by converting location information of the face region 430 into a form of a weight map based on the location of the face region 430. The weight map data 440 may be the location information of the face region 430 converted into a form of a two-dimensional (2D) map and may include weight information that depends on the location of the face region 430.

In the weight map data 440, different weights may be allocated to a corresponding region of the weight map data 440 corresponding to the face region 430 and a region corresponding to a non-face region. In addition, the weight map data 440 may be implemented to have a weight that varies according to a distance from a center of the corresponding region of the weight map data 440 corresponding to the face region 430. In the example of FIG. 4, the weight map data 440 may include a corresponding region (an 1 T region) 442 corresponding to the face region 430, a reduced region (a 0.5 T region) 441 of the corresponding region 442, extended regions (a 1.5 T region and a 2 T region) 443 and 444 of the corresponding region 442, and an outermost region 445. Regions 441, 442, 443, 444, and 445 may each have a different aspect ratio and overlap to be disposed based on a center of the corresponding region 442.

In the weight map data 440, a weight allocated to each of the regions 441, 442, 443, 444, and 445 may be different from each other. For example, a weight of 1 may be allocated to the reduced region 441 corresponding to an inner central region of the face region 430, and a weight of 0.75 may be allocated to a region between the corresponding region 442 corresponding to the face region 430 and the reduced region 441. For example, a weight of 0.5 may be allocated to a region between an extended region 443 and the corresponding region 442, and a weight of 0.25 may be allocated to a region between an extended region 444 and the extended region 443. For example, a weight of 0 may be allocated to a region between the outermost region 445 and the extended region 444. In this way, weight may be distributed and the weight map data 440 may show the weight gradually decreasing according to a distance from a center of the corresponding region 442 corresponding to the face region 430. However, this is merely an example, and the distribution of weight according to the weight map data 440 may vary. For example, the distribution of the weight may be continuously changing in proportion to a distance from the corresponding region 442 instead of changing in a stepwise manner as in the weight map data 440. When a region has a greater weight in the weight map data 440, region information of the input image 410 corresponding to the region may have a relatively higher impact on a liveness test result than that of the input image 410 corresponding to another region.

Figure 5:
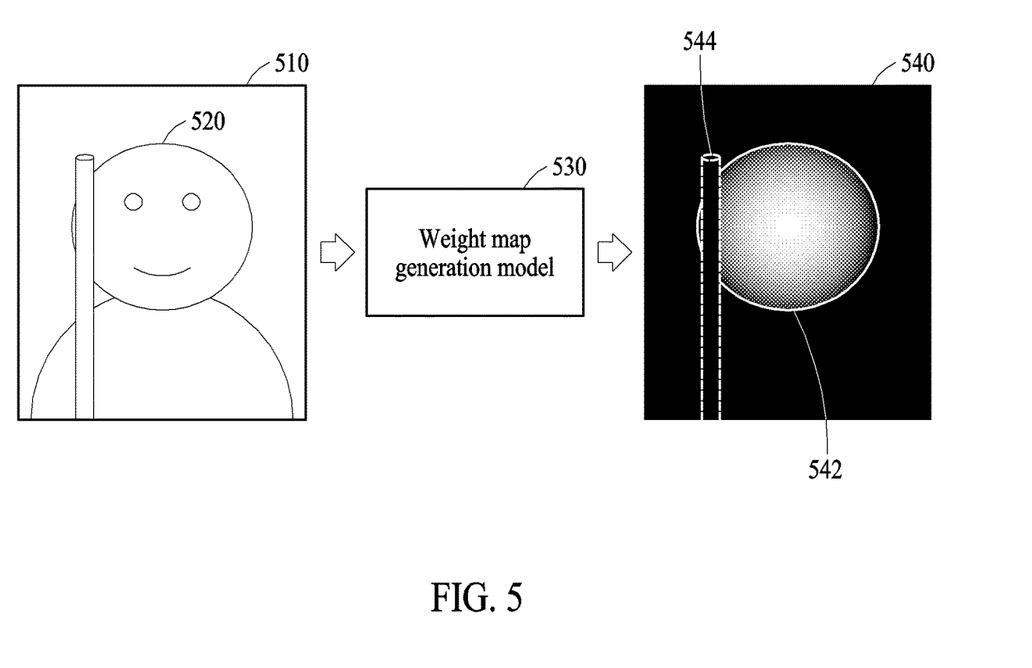
FIG. 5 illustrates another example of generating weight map data, according to one or more embodiments.

FIG. 5 illustrates an example of generating weight map data, according to one or more embodiments.

Referring to FIG. 5, weight map data 540 may be generated by a neural network-based weight generation model 530. An input image 510 in which an object 520 is shown may be input to the weight map generation model 530, and the weight map data 540 corresponding to the input image 510 may be output from the weight map generation model 530. The weight map generation model 530 may dynamically allocate a weight of the weight map data according to contextual information, such as face occlusion in the object 520, in the input image 510. As shown by the example of FIG. 5, when it is assumed that the input image 510 shows an occlusion region of a face region created by an obstacle, the weight map data 540 generated by the weight map data generation model 530 may include a first region 542 corresponding to the face region of the object and a second region 544 corresponding to the occlusion region in the face region, and a weight allocated to the first region 542 and a weight allocated to the second region 544 may be different from each other. An identical weight or a weight gradually decreasing as a distance from a center of the first region 542 increases may be allocated to the first region 542. Meanwhile, a weight of 0 may be allocated to the second region 544 corresponding to the occlusion region, and thus, the impact that the occlusion region shown in the input image has on a liveness test result may decrease.

Figure 6A:
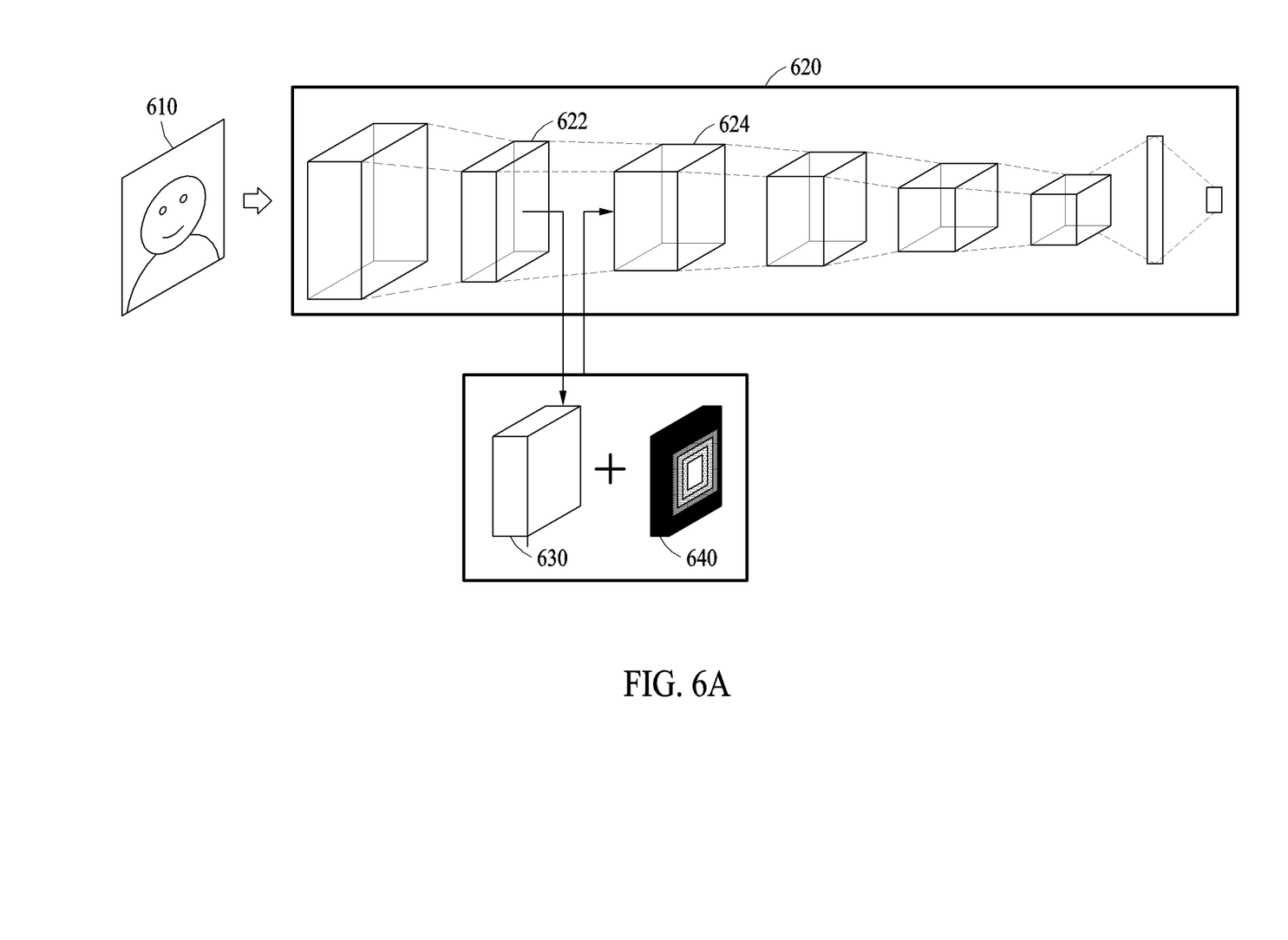
FIG. 6A illustrates an example of inputting concatenated data to a liveness test model, according to one or more embodiments.

FIG. 6A illustrates an example of inputting concatenated data to a liveness test model, according to one or more embodiments.

Referring to FIG. 6A, to perform a liveness test, an input image 610 may be input to a liveness test model 620. The liveness test model 620 may be, for example, a CNN. When weight map data (e.g., the weight map data 440 of FIG. 4 or the weight map data 540 of FIG. 5) is generated, a liveness test apparatus may input the weight map data to the liveness test model 620. The liveness test apparatus may generate concatenated data by concatenating feature data 630 (e.g., an activation map or vector data) output from a first intermediate layer 622 (e.g., a convolutional layer) of the liveness test model 620 and input the concatenated data to a second intermediate layer 624 of the liveness test model 620. To generate the concatenated data, feature data of another intermediate layer other than the first intermediate layer 622 may be used. For example, the second intermediate layer 624 may be an upper layer right above the first intermediate layer 622.

In generating the concatenated data, when the feature data 630 and the weight map data 640 each have a different size (for example, when the feature data 630 and the weight map data 640 each have different horizontal and vertical lengths), the liveness test apparatus may adjust a size of the weight map data 640 to correspond to a size of the feature data 630 to concatenate the weight map data 640 and the feature data 630. The liveness test apparatus may generate the concatenated data by concatenating the feature 630 and the weight map data of which the size is adjusted.

The liveness test model 620 may output a liveness score based on the input image 610 and the concatenated data input to the second intermediate layer, and the liveness test apparatus may determine a liveness test result based on the liveness score. Using the weight map data 640 may enable the face region of the input image 610 to have a larger impact on the liveness test result than another region, and accordingly, the accuracy of the liveness test result may be improved.

Figure 6B:
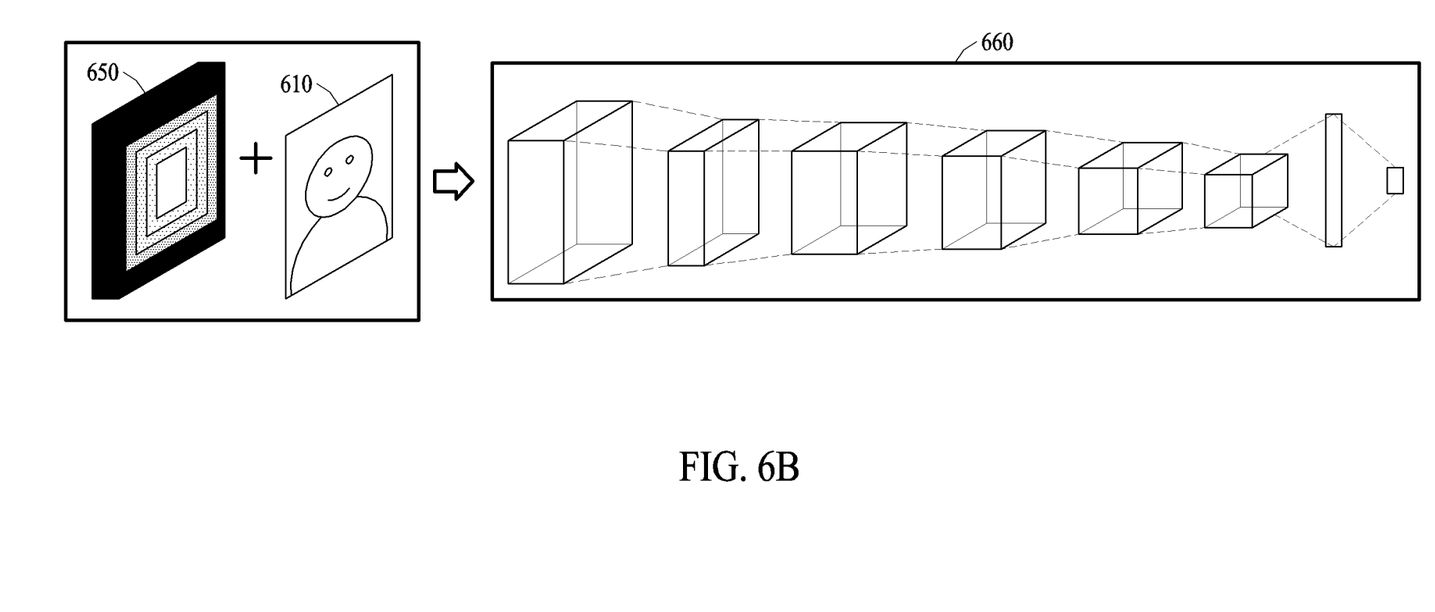
FIG. 6B illustrates an example of inputting concatenated data to a liveness test model, according to one or more embodiments.

FIG. 6B illustrates an example of inputting concatenated data to a liveness test model, according to one or more embodiments.

Referring to FIG. 6B, after weight map data 650 (e.g., the weight map data 440 of FIG. 4 or the weight map data 540 of FIG. 5) is generated, the liveness test apparatus may generate concatenated data by concatenating the weight map data 650 and the image data of the input image 610 and input the concatenated data to an input layer of a liveness test model 660. The liveness test model 660 may output a liveness score based on the input concatenated data, and the liveness test apparatus may determine a liveness test result based on the liveness score.

Figure 7:
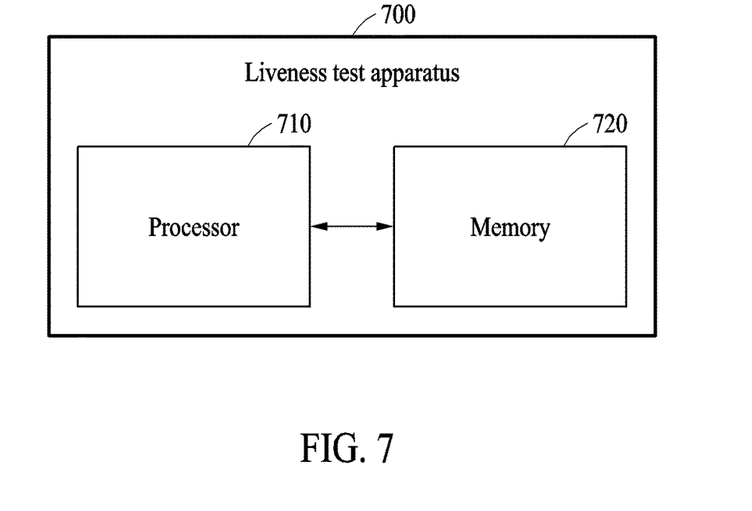
FIG. 7 is a block diagram illustrating an example of a configuration of a liveness test apparatus, according to one or more embodiments.

FIG. 7 is a block diagram illustrating an example of a configuration of a liveness test apparatus, according to one or more embodiments.

Referring to FIG. 7, a liveness test apparatus 700 may perform a liveness test on an object shown in an input image. The liveness test apparatus 700 may include a processor 710 and a memory 720.

The memory 720 may store a variety of data used by a component (e.g., the processor 710). The variety of data may include, for example, instructions and input data or output data. The memory 720 may include either one or both of a volatile memory and a non-volatile memory. Execution of such instructions by the processor 710 may configure the processor to implement any one, any combination, or all operations and/or methods described herein.

The processor 710 may execute instructions to perform operations of the liveness test apparatus 700. The processor 710 may execute, for example, instructions to configure the processor to control at least one other component (e.g., a hardware or hardware-implemented software component) of the liveness test apparatus 700 connected to the processor 710 and perform various types of data processing or operations.

As at least part of the data processing or operations, the processor 710 may store instructions or data in the memory 720, process the instructions or data stored in the memory 720, and store result data in the memory 720 or a storage device 230. The processor 710 may include a main processor (e.g., a central processing unit (CPU) or an application processor (AP)) or an auxiliary processor (e.g., a graphics processing unit (GPU) and a neural processing unit (NPU)) that is operable independently of, or in conjunction with the main processor.

The processor 710 may perform one or more operations described or illustrated herein in connection with a liveness test. For example, the processor 710 may detect a face region in an input image, that is a liveness test subject, and generate weight map data related to a face location in the input image based on the detected face region. The processor 710 may generate concatenated data by concatenating the weight map data with feature data output from a first intermediate layer of a liveness test model or image data of the input image and input the concatenated data to the liveness test model. When the concatenated data is generated by concatenating the weight map data and the feature data output from the first intermediate layer, the processor 710 may input the concatenated data to a second intermediate layer, which is an upper layer to the first intermediate layer of the liveness test model. When the concatenated data is generated by concatenating the weight map data and the image data of the input image, the processor 710 may input the concatenated data to an input layer of the liveness test model. Then, the processor 710 may determine a liveness test result based on a liveness score determined by the liveness test model.

Figure 8:
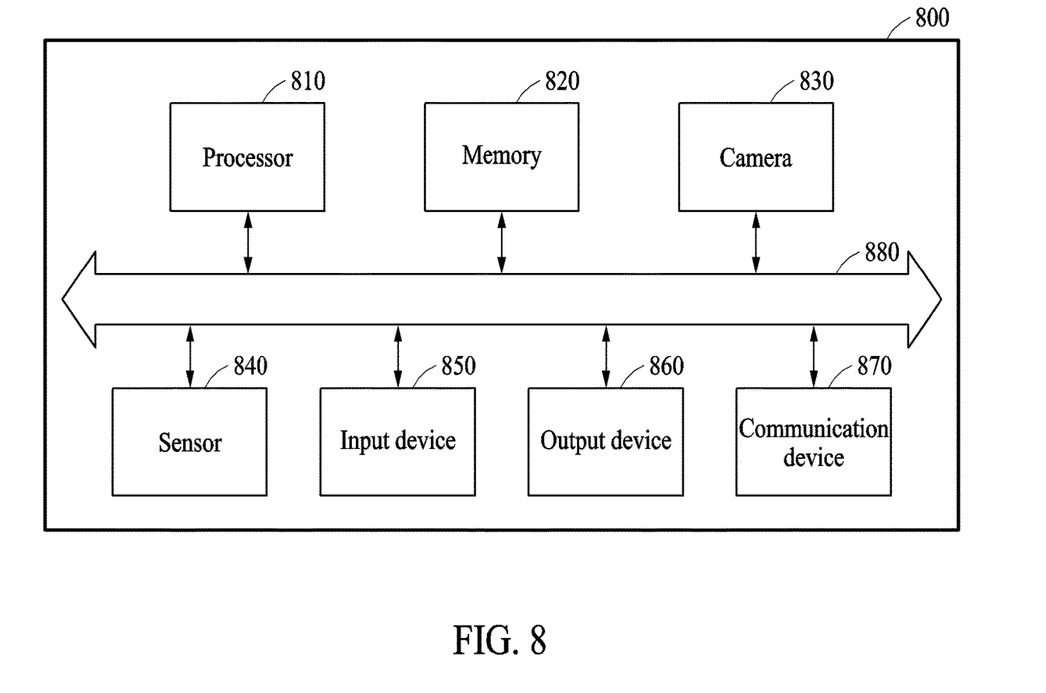
FIG. 8 is a block diagram illustrating an example of a configuration of an electronic device, according to one or more embodiments.

FIG. 8 is a block diagram illustrating an example of a configuration of an electronic device, according to one or more embodiments.

Referring to FIG. 8, an electronic device 800 (e.g., the electronic device 120 of FIG. 1) may be an electronic device in any of various forms. For example, the electronic device 800 may be a smartphone, a tablet computer, a personal digital assistant (PDA), a netbook, a laptop, a product inspection device, a personal computer, a wearable device (e.g., augmented reality (AR) glasses, a head mounted display (HMD), a smart car, a smart home appliance, a security device, an automated teller machine, or a server device, but is not limited thereto. The electronic device 800 may perform a liveness test on an object.

The electronic device 800 may include a processor 810, a memory 820, a camera 830, a sensor 840, an input device 850, an output device 860, and a communication device 870. At least some of the components of the electronic device 800 may be coupled mutually and communicate signals (e.g., instructions or data) therebetween via an inter-peripheral communication interface 880 (e.g., a bus, general purpose input and output (GPIO), a serial peripheral interface (SPI), a mobile industry processor interface (MIPI)).

The processor 810 may control overall operations of the electronic device 800 and execute functions and instructions to be executed within the electronic device 800. The processor 810 may perform operations of the liveness test apparatus described herein (e.g., the liveness test apparatus 700 of FIG. 7).

The memory 820 may store the instructions executable by the processor 810 and input/output data. The memory 820 may include a volatile memory such as a random-access memory (RAM), a dynamic random-access memory (DRAM), and a static random-access memory (SRAM) and/or a non-volatile memory known in the art such as a read-only memory (ROM) and a flash memory.

The camera 830 may capture an image. The camera 830 may obtain, for example, a color image, a black and white image, a gray image, an infrared image or a depth image. The camera 830 may obtain an input image in which an object is shown, and the processor 810 may perform a liveness test based on the obtained input image.

The sensor 840 may detect an operational state (e.g., power or temperature) of the electronic device 800 or an external environmental state (e.g., a state of a user), and generate an electrical signal or data value corresponding to the detected state. The sensor 840 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The input device 850 may receive a user input from a user through a video, audio, or touch input. The input device 850 may include, for example, a keyboard, a mouse, a touch screen, a microphone, or any other device that transmits a user input to the electronic device 800.

The output device 860 may provide an output of the electronic device 800 to the user through a visual, auditory, or haptic channel. The output device 870 may include, for example, a liquid crystal display or a light emitting diode (LED)/organic light emitting diode (OLED) display, a micro LED, a touch screen, a speaker, a vibration generating device, or any other device capable of providing the output to the user.

The communication device 870 may support the establishment of a direct (or wired) communication channel or a wireless communication channel between the electronic device 800 and an external electronic device, and support the communication through the established communication channel. According to an example, a communication module may include a wireless communication module (e.g., a cellular communication module, a short-range wireless communication module, or a global navigation satellite system (GNSS) communication module) or a wired communication module (e.g., a local area network (LAN) communication module, or a power line communication module). The wireless communication module may communicate with the external device via a short-range communication network (e.g., Bluetooth™, wireless-fidelity (Wi-Fi) direct, or infrared data association (IrDA)) or a long-range communication network (e.g., a legacy cellular network, a 5G network, a next-generation communication network, the Internet, or a computer network (e.g., a LAN or a wide area network (WAN)).

Figure 9:
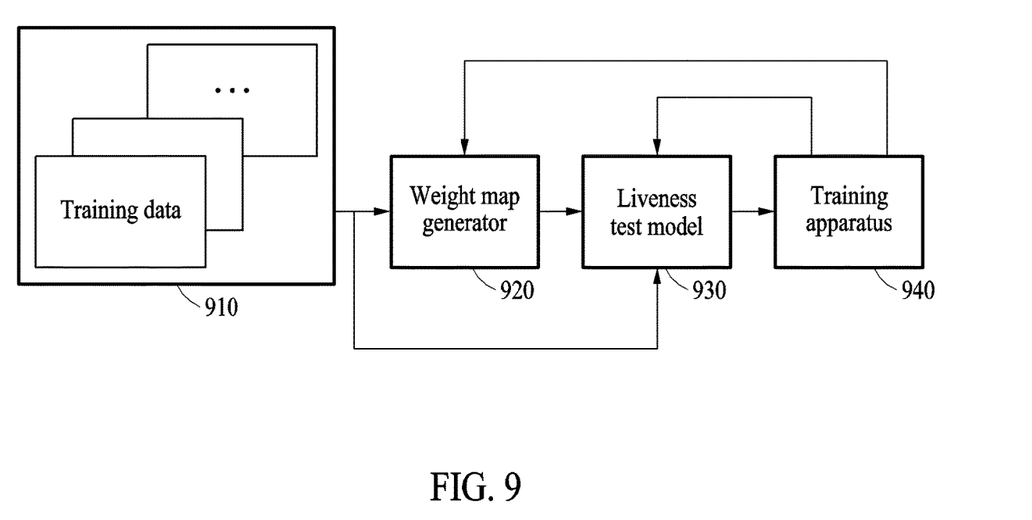
FIG. 9 illustrates an example of training of a liveness test model, according to one or more embodiments.

FIG. 9 illustrates an example of training of a liveness test model, according to one or more embodiments.

A liveness test model described herein may have parameters (e.g., connection weights) determined through a training process. Referring to FIG. 9, in a training process, a large quantity of training data 910 (e.g., a training image) and a desired value corresponding to each piece of the training data 910 is provided. In the training process, a liveness test model 930 may receive the training data 910 and output a result value corresponding to the training data 910 through a calculation process based on the parameters. Here, a weight map generator 920 may generate weight map data corresponding to the training data 910 based on the training data 910. The weight map generator 920 may generate the weight map data as described in FIG. 4 or FIG. 5, and thus, detailed descriptions thereof are not provided here.

Depending on the example, the weight map data generated by the weight map generator 920 may be concatenated with feature data output from a first intermediate layer of a liveness test model 930 or the current training data 910. When concatenated data is generated by concatenating the feature data of the first intermediate layer and the weight map data, the concatenated data may be input to a second intermediate layer right above the first intermediate layer. When concatenated data is generated by concatenating the training data 910 and the weight map data, the concatenated data may be input to an input layer of the liveness test model 930.

A training apparatus 940 may update parameters of the liveness test model 930 based on a result value output from the liveness test model 930. The training apparatus 940 may calculate a loss based on a difference between the result value output from the liveness test model 930 and a desired value corresponding to the training data 910 and adjust the parameters of the liveness test model 930 to reduce the loss. Various loss functions may be used to calculate a loss and adjustment of parameters may be performed by, for example, a back propagation algorithm. The training apparatus 940 may iteratively perform this process for each piece of the large quantity of the training data 910, and accordingly, the parameters of the liveness test model 930 may be desirably adjusted in a gradual manner. The training apparatus 940 may train the liveness test model 930 using various machine learning algorithms in addition to the training method described herein.

When the weight map generator 920 is a neural network-based weight map generation model, the training apparatus 940 may also train the weight map generator 920. Here, the training data 910 and desired weight map data corresponding to the training data 910 are provided, and the training apparatus 940 may update parameters of the weight map generator 920 for the weight map generator 920 to output weight map data most similar to the desired weight map data corresponding to the training data 910 input to the weight map generator 920.

The liveness test apparatus, processor, sensor, electronic device, liveness test apparatus 700, processor 710, 810, electronic device 120, 800, sensor 840, communicative device 870, weight map generator 920, and training apparatus 940, in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    detecting a face region in an input image;
    generating, based on the detected face region, weight map data related to a face location in the input image;
    generating concatenated data by concatenating the weight map data with feature data generated from an intermediate layer of a liveness test model or with image data of the input image; and generating a liveness test result based on a liveness score generated by the liveness test model provided with the concatenated data.

2. The method of claim 1, wherein
the weight map data comprises a first region corresponding to the face region in the input image and a second region corresponding to a non-face region in the input image, and
a weight of the first region and a weight of the second region are different from each other.

3. The method of claim 1, wherein a weight of the weight map data varies based on a distance from a center of a corresponding region of the weight map data corresponding to the face region.

4. The method of claim 3, wherein
the weight map data comprises a reduced region of the corresponding region, the corresponding region, and an extended region of the corresponding region, and
the reduced region, the corresponding region, and the extended region overlap to be disposed based on the center of the corresponding region.

5. The method of claim 4, wherein
a first weight of the reduced region is greater than a second weight of a region between the corresponding region and the reduced region, and
the second weight is greater than a third weight of a region between the extended region and the corresponding region.

6. The method of claim 1, wherein
the concatenated data is generated by concatenating the weight map data and the feature data,
the provision of the concatenated data includes a provision of the concatenated data to another intermediate layer of the liveness test model, and
the other intermediate layer is subsequent to the intermediate layer.

7. The method of claim 1, wherein
the concatenated data is generated by concatenating the weight map data and the image data of the input image, and
the provision of the concatenated data includes a provision of the concatenated data to an input layer of the liveness test model.

8. The method of claim 1, wherein the generating of the weight map data comprises generating the weight map data using a neural network-based weight map generation model.

9. The method of claim 8, wherein a weight of a first region of the weight map data corresponding to the face region is different from a weight of a second region of the weight map data corresponding to an occlusion region in the face region.

10. The method of claim 1, wherein the generating of the concatenated data comprises:
adjusting a size of the weight map data to correspond to a size of the feature data; and
generating the concatenated data by concatenating the feature data and the weight map data of which the size is adjusted.

11. A non-transitory computer-readable storage medium storing instructions that, when executed by one or more processors, cause the one or more processors to perform the method of claim 1.

12. An apparatus comprising:
one or more processors; and
a memory comprising one or more non-transitory storage media that store instructions that, when executed by the one or more processors, causes the apparatus to:
detect a face region in an input image;
generate, based on the detected face region, weight map data related to a face location in the input image;
generate concatenated data by concatenating the weight map data with feature data generated from an intermediate layer of a liveness test model or with image data of the input image; and
determine a liveness test result based on a liveness score determined by the liveness test model provided with the concatenated data.

13. The apparatus of claim 12, wherein
the weight map data comprises a first region corresponding to the face region in the input image and a second region corresponding to a non-face region in the input image, and
a weight of the first region and a weight of the second region are different from each other.

14. The apparatus of claim 12, wherein a weight of the weight map data varies based on a distance from a center of a corresponding region of the weight map data corresponding to the face region.

15. The apparatus of claim 12, wherein
the concatenated data is generated by concatenating the weight map data and the feature data,
the provision of the concatenated data includes a provision of the concatenated data to another intermediate layer of the liveness test model, and
the other intermediate layer is subsequent to the intermediate layer.

16. The apparatus of claim 12, wherein
the concatenated data is generated by concatenating the weight map data and the image data of the input image, and
the provision of the concatenated data includes a provision of the concatenated data to an input layer of the liveness test model.

17. The apparatus of claim 12, wherein
the execution of the instructions further causes the apparatus to generate the weight map data using a neural network-based weight map generation model, and
a weight of a first region of the weight map data corresponding to the face region is different from a weight of a second region of the weight map data corresponding to an occlusion region in the face region.

18. An electronic device, comprising:
a camera configured to obtain an input image;
one or more processors; and
a memory comprising one or more non-transitory storage media that store instructions that, when executed by the one or more processors, causes the electronic device to:
detect a face region and a non-face area in an input image;
generate, based on the face region and the non-face area, weight map data comprising a plurality of regions each having different weights;
generate concatenated data by concatenating one of the regions of the weight map data with feature data generated from an intermediate layer of a liveness test model; and
generate a liveness test result based on a liveness score generated by the liveness test model provided with the concatenated data,
wherein the liveness test model is a machine learning model or neural network model.

19. The electronic device of claim 18, wherein
the weight map data comprises a first region corresponding to the face region in the input image and a second region corresponding to a non-face region in the input image, and
a weight of the first region and a weight of the second region are different from each other.

20. The electronic device of claim 18, wherein
the provision of the concatenated data includes a provision of the concatenated data to another intermediate layer of the liveness test model, and
the other intermediate layer is subsequent to the intermediate layer.

\* \* \* \* \*